(12) United States Patent
Nicholson et al.

(10) Patent No.: US 9,964,466 B1
(45) Date of Patent: May 8, 2018

(54) TURBINE ENGINE MAIN SHAFT BEARING THRUST SENSOR

(71) Applicant: The United States of America as represented by the Secretary of the Air Force, Washington, DC (US)

(72) Inventors: Brian D Nicholson, Dayton, OH (US); Jeremy T Nickell, Troy, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days. days.

(21) Appl. No.: 15/347,940

(22) Filed: Nov. 10, 2016

Related U.S. Application Data

(60) Provisional application No. 62/320,010, filed on Apr. 8, 2016.

(51) Int. Cl.
*G01L 1/22* (2006.01)
*G01M 13/04* (2006.01)
*G01L 5/00* (2006.01)

(52) U.S. Cl.
CPC ........... *G01M 13/04* (2013.01); *G01L 5/0019* (2013.01)

(58) Field of Classification Search
CPC ............................. G01L 5/0019; G01M 13/04
USPC ..................................... 73/862.045
See application file for complete search history.

(56) References Cited

U.S. PATENT DOCUMENTS

| 3,146,037 | A | 8/1964 | Hooker |
| 3,895,689 | A | 7/1975 | Swearingen |
| 4,089,216 | A * | 5/1978 | Elias ..................... G01L 1/2231 73/862.31 |
| 5,427,455 | A | 6/1995 | Bosley |
| 6,105,439 | A | 8/2000 | Roger |
| 7,430,926 | B2 | 10/2008 | Haaser |
| 7,707,902 | B2 | 5/2010 | Haaser |
| 2004/0193384 | A1* | 9/2004 | Edlund ................... F04B 49/00 702/138 |
| 2010/0005897 | A1* | 1/2010 | Fleury ................... G01L 5/0061 73/781 |

FOREIGN PATENT DOCUMENTS

| DE | 2802176 A1 | 7/1979 |
| DE | 3302732 A1 | 8/1983 |

OTHER PUBLICATIONS

DE 2802176A1 translation.
DE 3302732 translation.

* cited by examiner

*Primary Examiner* — Max Noori
(74) *Attorney, Agent, or Firm* — AFMCLO/JAZ; Timothy Barlow

(57) ABSTRACT

A device for measuring axial load on a thrust bearing in an engine having an shaft inside a fixed structure comprises: stability platform in contact with the fixed structure and prevented from motion in an axial direction; at least one load tab adjacent to and supported by the stability platform, the at least one load tab oriented perpendicularly to the axial direction, each load tab having a free end opposite the end supported by the stability platform, the free end adjacent the shaft; and deflection sensor attached to the at least one load tab and responsive to the axial load, wherein the axial load is applied to the free end of the at least one load tab. An offset body may be attached between the at least one load tab and the stabilizing body, and plurality of load tabs may be arranged symmetrically on the stability platform.

13 Claims, 22 Drawing Sheets

SECTION C-C

SECTION E-E

SECTION D-D

TURBINE ENGINE MAIN SHAFT BEARING THRUST SENSOR

Pursuant to 37 C.F.R. § 1.78(a)(4), this application claims the benefit of and priority to prior filed Provisional Application Ser. No. 62/320,010, filed 8 Apr. 2016, which is expressly incorporated herein by reference.

RIGHTS OF THE GOVERNMENT

The invention described herein may be manufactured and used by or for the Government of the United States for all governmental purposes without the payment of any royalty.

FIELD OF THE INVENTION

This invention relates generally to the measurement of forces applied through an axial centerline that is inaccessible and more particularly to a device for measuring the thrust load exerted on a main-shaft bearing of a turbine engine or other turbomachinery.

BACKGROUND OF THE INVENTION

Modern aircraft turbine engines require small, lightweight components capable of withstanding temperature extremes. Engine efficiency, performance, and maintenance costs are significantly influenced by the thrust or axial load the engine places on the main shaft rolling element bearings. Historically, there have been several efforts to measure thrust load. These methods usually require complicated geometries or intricate fiber optic measurement methods. The measurement of thrust loads were previously unavailable, and therefore engine designs have relied upon complicated and often inaccurate mathematical models to determine thrust loads. Additionally, bearing life models used to ensure safety and robustness of main shaft bearings are based on rig testing rather than real world measurements. These limitations likely result in engines that are overdesigned and make it unnecessarily costly to build and/or operate. The ability to measure the real thrust load on a main shaft bearing enables significant improvements in the scientific knowledge, design, performance, and economy of turbine engines.

A simple and reliable method for measuring bearing thrust load in a turbine aircraft engine has remained elusive, largely due to the unique challenges of such an application. Some thrust load measurement devices rely on hydraulic thrust indication or require the use of fluid bearings, neither of which are suitable for a turbine aircraft engine. Other devices require placement directly on the centerline of the shaft which is not possible for a turbine engine. Many of the known devices are either large or heavy, both detrimental factors in the design of a modern, compact, lightweight aircraft engine. Innovative devices have been presented in recent years that would be suitable for such an application, however, these devices have been found to have significant disadvantages as well, i.e., such devices incorporate a deformable ring or wave washer for thrust measurements. It has been found that, depending on the instrumentation used, this type of device is detrimentally sensitive to instrumentation placement or requires twice as much instrumentation per measurement. Fiber optic sensors have also been proposed, however mechanical noise and contaminated or non-homogeneous environments present significant challenges to this type of technology.

SUMMARY OF THE INVENTION

The present invention overcomes the foregoing problems and other shortcomings, drawbacks, and challenges of turbine engine main shaft bearing thrust sensors. While the invention will be described in connection with certain embodiments, it will be understood that the invention is not limited to these embodiments. To the contrary, this invention includes all alternatives, modifications, and equivalents as may be included within the spirit and scope of the present invention.

In one embodiment, the present invention is a device and methodology for, generally, measuring a coaxial force, and specifically intended to measure the main-shaft bearing thrust load of a turbine aircraft engine. The invention may include a plurality of load tabs arranged perpendicularly to and symmetrically about the central axis of the invention, which may also be arranged coaxially with the shaft or load path of the application, e.g. a turbine engine. The load tabs may be designed and may be instrumented to measure deflection and/or strain, thereby providing means to derive the axial load in question. In some embodiments a spacer which may be integral to the load tab or a separate part, may be included to maintain cantilever beam-in-bending functionality. The load tabs may be mounted to the static structure or housing structure of the application by means of a stability platform. An offset body may be incorporated between the stability platform and the load tabs to provide the necessary space for tab deflection. Bi-directional thrust loads may be measured by either fastening the tabs and stability platform to the rotor structure (e.g. at the bearing) and the static structure, respectively, or by providing two devices for measuring axial loads on a thrust bearing, one forward and one aft of the thrust bearing. One, some, or all of the load tabs may be instrumented to minimize instrumentation in the case of the former or provide sensor redundancy and/or non-uniform load sensing capability in the case of the latter.

According to one embodiment of the present invention, a device for measuring the axial load on a thrust bearing in an engine having a shaft inside a fixed structure may comprise a stability platform in contact with the fixed structure and prevented from motion in an axial direction, i.e. load direction as illustrated in FIG. 2, for example; at least one load tab adjacent to and supported by the stability platform, the at least one load tab oriented perpendicularly to the axial direction, each load tab having a free end opposite the end supported by the stability platform, the free end adjacent the shaft; and a deflection sensor attached to the at least one load tab and responsive to axial load, wherein the axial load is applied to the free end of the at least one load tab. This arrangement provides the ability to accurately measure thrust loads in an engine having a rotating shaft, such as a turbine engine, via the deflection sensor. In one embodiment the deflection sensor may provide information regarding the deflection of the free end of each instrumented load tab to a computer having software and an algorithm which correlates the deflection with a thrust value. The stability platform and the load tab may be attached to each other.

According to a first variation, the device for measuring axial loads in a thrust bearing may further comprise an offset body attached between the at least one load tab and the stability platform. The offset body may be attached between the load tab and the stabilizing body to provide a more compact arrangement in the radial direction while still providing a measurable deflection of the load tabs in response to a thrust load.

According to another variation, the device for measuring axial loads in a thrust bearing may further comprise a plurality of load tabs arranged symmetrically on the stability platform. This provides the advantage of a distributed load around the shaft. A distributed load may provide redundancy for damaged or inoperative deflection sensors on individual load tabs, or may compensate for broken load tabs. In addition, a symmetric arrangement provides the ability to receive feedback regarding asymmetric thrust loads.

According to a further variation, the free end of the at least one load tab may be oriented radially inward toward the device axis. According to another variation, the free end of said load tabs may be oriented radially outward away from the device axis. These arrangement provide the opportunity to adapt the device to a variety of thrust bearing arrangements.

According to a further variation, the device for measuring axial loads in a thrust bearing may further comprise a spacer between the free end of the at least one load tab and the shaft, and the spacer may be integral to the free end of the at least one load tab. The spacer provides the opportunity to adapt the device to a variety of thrust bearing arrangements.

According to another variation, the deflection sensor may be at least one of a strain gauge or a proximity sensor, or combinations thereof. Numerous types of gauges, sensors and their combinations may be used to achieve the desired thrust measurement goals, and to adapt the system to the particular engine application desired.

According to a further variation, the proximity sensor may be used to monitor the displacement of the free end of the at least one load tab. Any displacement or flex of the load tabs relative to the proximity sensors, which are mounted to the stability platform or other portion of the structure which is stationary relative to the load tabs, may be converted into an equivalent thrust value. The individual thrust values from each load tab may be utilized as discrete data points or may be aggregated to an overall thrust value.

According to another variation, the strain gauge may be used to measure material strain in the at least one load tab. Any strain of the materials of the load tabs, which corresponds to displacement or flex of the load tabs relative to the proximity sensors, may be converted into an equivalent thrust value. The individual thrust values from each load tab may be utilized as discrete data points or may be aggregated to an overall thrust value.

According to a further variation, the free end of the at least one load tab may be fixed to a support for the shaft. This support may be a bearing assembly or other component which is isolated from the end of the load tab which is supported by the stability platform. By having one end of each of the load tabs attached to the shaft, and the other end attached to the housing, the load tabs may be able to provide thrust information in both axial directions, e.g., acceleration and deceleration.

According to another variation, the device for measuring axial loads in a thrust bearing may further comprise a second stability platform in contact with the fixed structure and prevented from motion in a second axial direction opposite the axial direction; at least one second load tab adjacent to and supported by the second stability platform, the at least one second load tab oriented perpendicularly to the axial direction, each second load tab having a free end opposite the end supported by the second stability platform, the free end adjacent the shaft; and a second deflection sensor attached to the at least one second load tab providing deflection information correlating to thrust load, wherein the axial load is applied to the free end of the at least one second load tab. This arrangement provides the advantage of a first set of dedicated load tabs to measure thrust values in one axial direction, and a second set of dedicated load tabs to measure thrust values in the opposite axial direction. Thrust values may include acceleration, deceleration, and combinations thereof.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
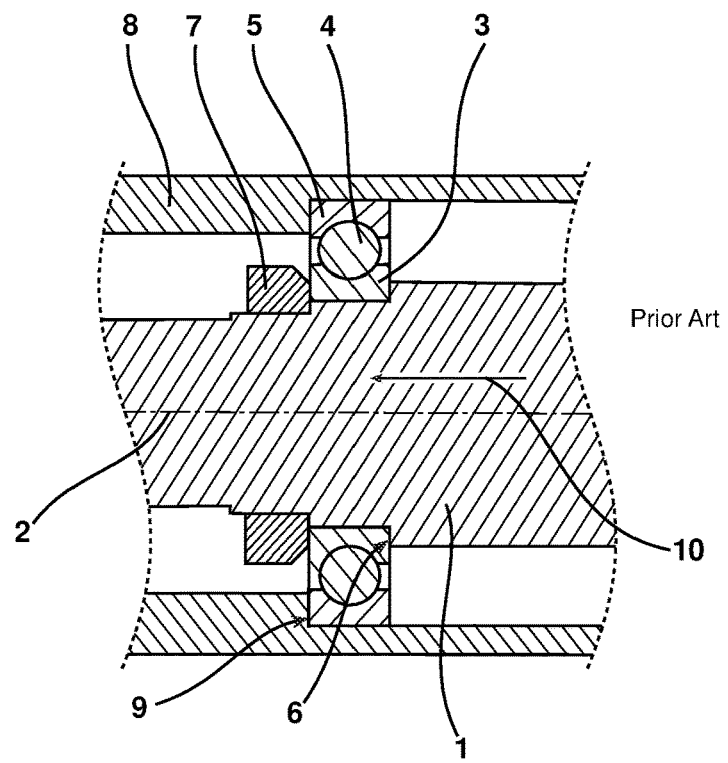
FIG. 1 depicts a cross-sectional view of a typical, but simplified, shaft thrust mounting of an aircraft turbine engine, according to the prior art.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

This invention provides measurement capability of main shaft bearing thrust or axial load in a turbine engine application. In one embodiment the device 30 may consist of a ring (e.g. circular plate or cylinder or stability platform 13) with an outer diameter flange at one axial end and a set of outwardly or inwardly oriented load tabs 11 at the other end, symmetrically spaced around the ring's circumference, as depicted in FIGS. 4, 6-8, 13-15 and 17-19. Strain gauges 17 may be mounted on one, some, or all of the load tabs 11 in order to measure the bending strain in the load tabs as an axial load is applied to the device 30, i.e. through the device's load tabs 11. Other types of instrumentation 26, e.g. proximity probe 19, may be used to measure displacement of the load tabs 11. This measured strain or displacement may then be correlated to the applied load. The use of multiple load tabs 11 that are symmetrically spaced may provide uniform loading to the device as well as measurement redundancy in case of the failure of one or more of the strain gauges 17.

A sensor device 30 for measuring the axial load exerted by a shaft 1, e.g. a rotating or rotatable shaft, on a static structure 8 may consist of a multiplicity of instrumented load tabs 11 and their stabilizing platform 13 placed in the load path at the interface between the rotatable and static structures. The axial thrust load placed on the load tabs 11 causes bending of the load tabs 11, the deflection or bending strain may be measured, thereby supplying the ability to determine the applied thrust load. The geometry, materials, and instrumentation may be determined by the space available for the device 30 as well as the environmental parameters of the application, such as a turbine engine.

In one embodiment, the device 30 may consist of four main features: a stability platform 13, an offset body 12, a symmetrical plurality of load tabs 11, and measurement instrumentation, e.g. deflection sensor(s) 26. The individual components may be integrated into a single unit. The stability platform 13 is located at one axial end of the device 30 and provides an axially-stable surface to interface with the static structure of the machine being measured. In one embodiment, the interface with the static structure 8 may be a resting interface for single direction (compression) measurements or a bonded/fastened interface for bi-directional (compression and tension) measurements. Bi-directional measurement may also be made by using two of the compression-only devices oriented in an opposing manner on each axial side of the bearing being measured.

The geometry of various components of the device 30, such as platform thickness and perimeter, may be selected such that any deflection or deformation of the platform during operation may be negligible (an order of magnitude or less) with respect to the deflection of the load tabs. By 'negligible', it is meant that the platform may be designed to exhibit almost zero deflection, compared to the load tabs. This ensures that the load tab is the most sensitive to the axial load. In one embodiment the offset body may provide an axial spatial gap, e.g. an offset body 12, between the stability platform 13 and the load tabs 11. In one embodiment the axial gap may be of a size such that deflection of the load tabs 11 under full loading is accommodated without interaction (i.e. no contact) between the load tabs 11 and the stability platform 13, device instrumentation 26, and/or the static structure 8 of the machine on which measurements are being executed. In another embodiment the geometry of the offset body 12 may be selected with device material(s) in mind such that the axial stiffness of the offset body 12 causes negligible deflection under full device loading with respect to deflection of the load tabs 11.

In one embodiment, the load tabs 11 are located at the axially opposite end of the device 30 from the stability platform 13 and may be spaced symmetrically around the perimeter of the offset body 12 to ensure uniform axial loading during operation. The load tabs 11 may interface with the static structure 8 in a direct load path between the thrust bearing 86 and the static structure 8 to ground of the machine to which measurements are made. This interface may occur on each load tab 11 in an area which includes less than 25% of the overall inner to outer load tab 1 length and in conjunction with the outer edge of each load tab 11, such that the axial load to be measured is applied to the free ends of the load tabs 11. The interface area may be adjusted within a broad range, e.g. less than 50% of the overall inner to outer load tab length, in order to achieve the desired performance characteristics. The load tabs 11 may function similar to a transversely-loaded cantilever beam in bending.

Deflection of the load tabs under loading may be measured using a deflection sensor 26 including a strain gauge 17 or proximity probe 19 mounted to the stability platform 13 or static structure 8 and interacting with the load tab(s) 11. In one embodiment, the strain gauges 17 may be mounted at the center length of the load tab 11, which strain gauges 17 measure the strain of the tab 11 under loading. Selection of sensors to measure the deflection or strain may be application-specific and take into account the relevant environment and the magnitude of the desired measurement. Each load tab 11 may experience a load that is about equivalent to the total load on the device divided by the number of load tabs 11 incorporated into the device 30.

The appropriate dimensions of each load tab 11 of the overall device 30 may be determined through an analysis of the state of stress based on the predicted load. Consideration should be put into the material selected for the load tab 11 in order for the part to withstand the calculated stress and expected application temperature. The thrust load within an engine may then be calculated from the measured stress of the load tab 1. The load on a given load tab 11 may be calculated using classical beam-under-loading equations. The load calculated by these methods may then be multiplied by the number of measurement tabs of the device to determine the total axial/thrust load. Alternatively, a calibration process may be executed before use in which the device is subjected to known axial loads and those loads are correlated to the measured strain or deflection. The material and geometry of the device may be selected such that the previously-stated deflection criteria is met, the available spatial envelope of the machine being measured is accounted for, and the environmental and operating conditions are accounted for, both the ambient conditions and those created by the machine itself (e.g. temperature, electrical, chemical, etc.).

The following examples illustrate particular properties and advantages of some of the embodiments of the present invention. Furthermore, these are exemplary embodiments of the present invention, and confirmation that the principles described in the present invention are valid. The specific design choices should not be construed as in any way limiting the scope of the invention.

FIG. 1 depicts the general prior art configuration of the shaft thrust mounting of an aircraft turbine engine with a load direction 10. This configuration is made up of a shaft 1 which is free to rotate about a centerline 2, an angular contact ball bearing 86 which includes an inner ring 3, a number of rolling elements 4, and an outer ring 5. The inner ring 3 of the bearing is mounted on the shaft 1 with an axial stop or shaft step 6 on one side and a lock nut 7 on the opposite side, securing the bearing to the shaft 1. The outer ring 5 fits snugly into the static structure 8, but is allowed to slide axially using a minimal amount of clearance between the outer ring 5 and the static structure 8. Additionally, the static structure 8 may possess one or more axial stops 9. In the case of a thrust load consistently in one direction 10, the static structure 8 may possess one axial stop 9 to react to that load. In the case of a bi-directional thrust load, not pictured, the static structure 8 may also possess an axial stop 9 on the opposite side of the outer ring 5 of the bearing 86.

Figure 2:
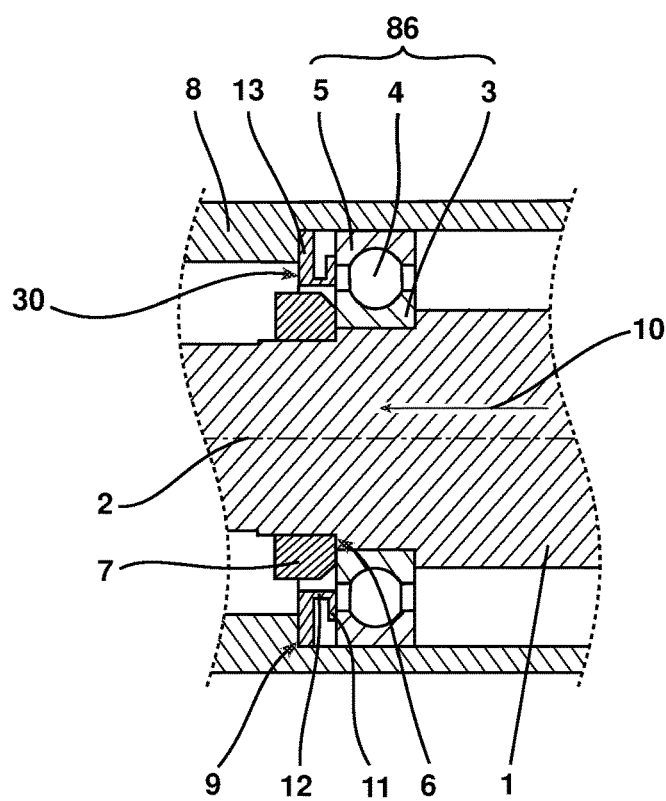
FIGS. 2-3 depict a cross-sectional view of a main-shaft bearing thrust sensor integrated into the shaft mounting of an aircraft turbine engine.
Figure 3:
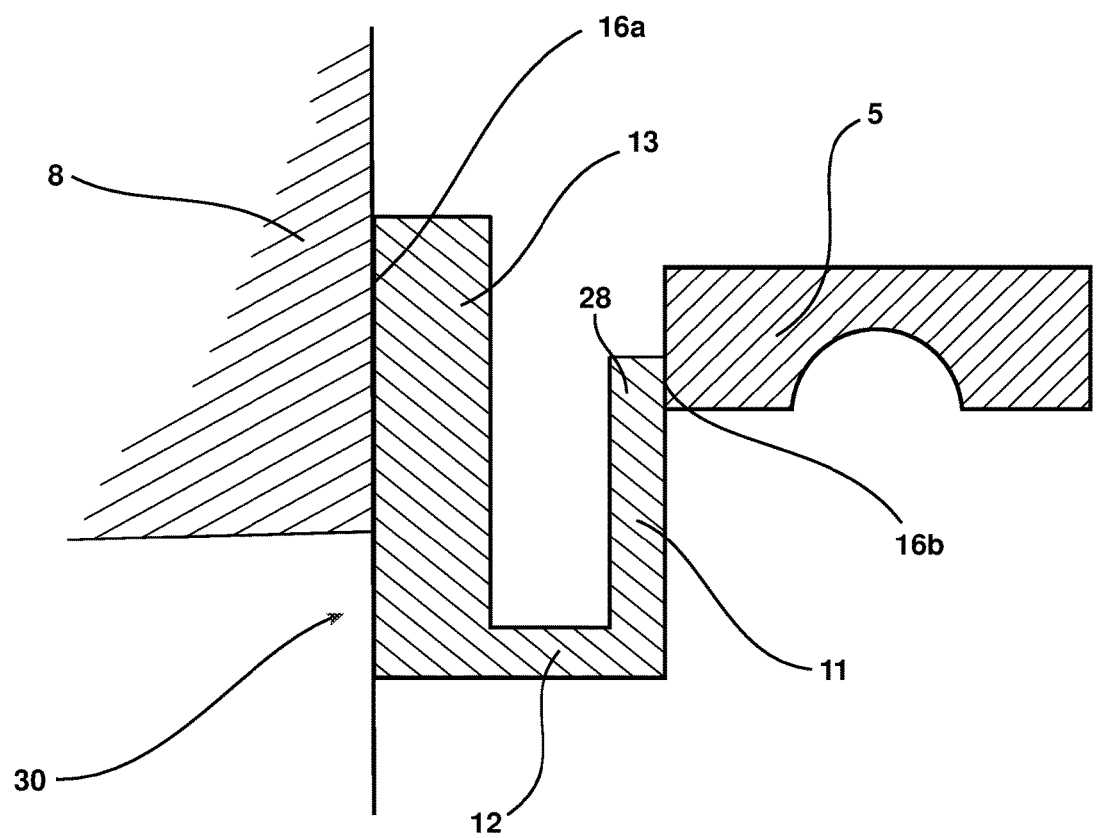

FIGS. 2-3 illustrate the integration of the device 30 into a general turbine engine, such as the configuration displayed in FIG. 1. In this embodiment the device 30 includes at least one, two or a plurality of load tabs 11 and an offset body 12 which may be integral with a stability platform 13. The thrust force 10 of the rotating shaft 1 is transmitted through the bearing assembly 86 to the load tabs 11 via contact surfaces 16*a* (e.g. between static structure 8 and stability platform 13, and between bearing 5 and load tab 11). In response to the thrust force 10, the load tabs 11 elastically deflect in a manner analogous to a cantilevered beam in bending while transmitting the load through the offset body 12 into the stability platform 13 and finally to the static structure 8 through the axial stop 9 and another contact surface 16*b*. Measurement of the deflection of the load tabs 11 or the bending strain of the load tabs 11 may be used to determine the total thrust load. A bearing lock nut 7 may be used to fix the bearing 86 in a shaft axial stop 6.

Figure 4:
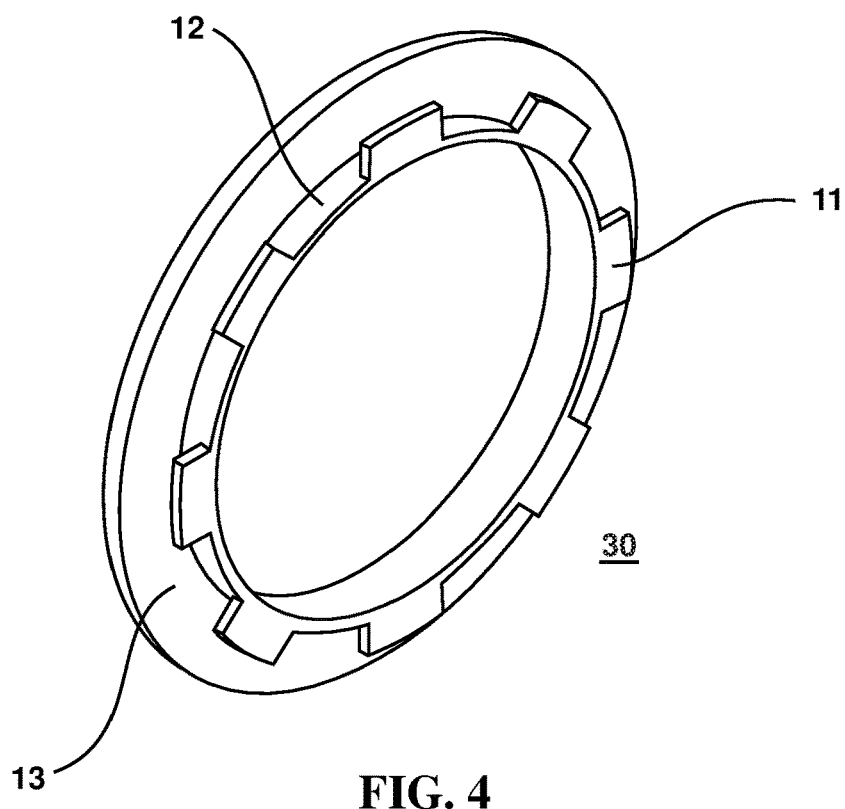
FIG. 4 depicts an isometric view of the embodiment of the invention shown in FIGS. 2-3 with outwardly-oriented load tabs.
Figure 5:
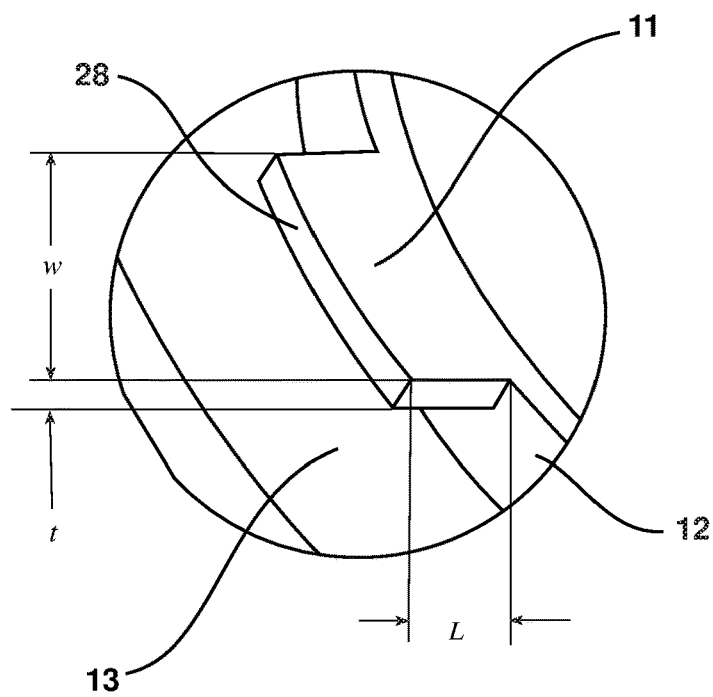
FIG. 5 depicts the geometric design parameters of a load tab, according to an embodiment of the invention.
Figure 6:
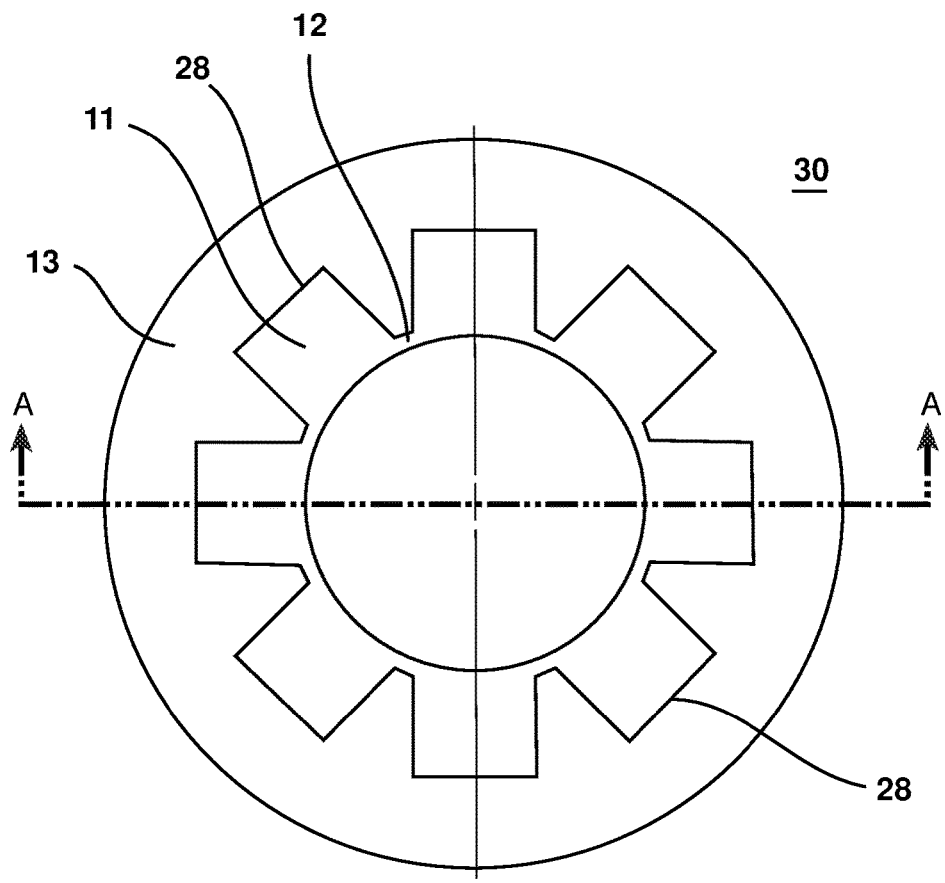
FIG. 6 depicts a plan view of the embodiment of FIG. 4 having outwardly-oriented load tabs.
Figure 7:
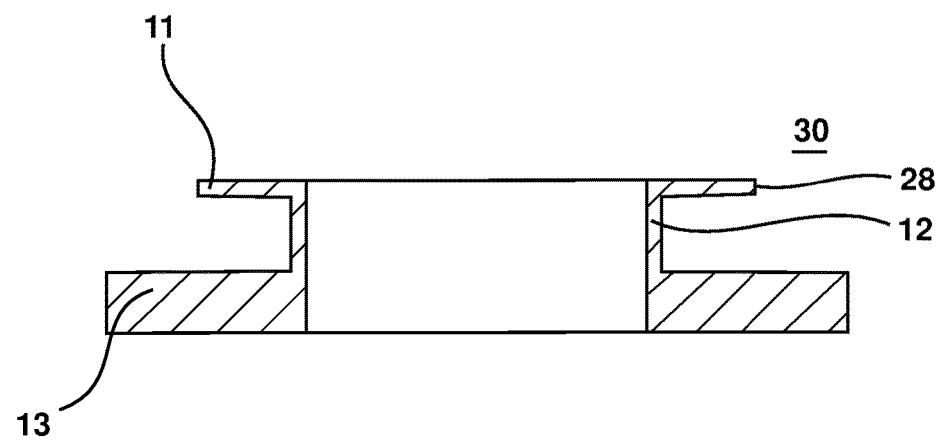
FIG. 7 depicts a sectional view of the embodiment of FIG. 6 having outwardly-oriented load tabs.

FIG. 4 depicts an isometric view of the device 30 of FIG. 2. FIG. 5 is a detail view of a load tab 11 depicted in FIG. 4, and FIGS. 6-7 are corresponding plan and sectional views, respectively, of the sensor arrangement of FIG. 2. Each of these arrangements of the device 30 includes a stability platform 13 connected to one or more loading tabs 11 by an offset body 12, as well as one or more deflection sensors 26. The number of tabs 11, their lengths, widths, and thicknesses, as well as the material from which the tabs 11 are constructed may be prescribed by the expected maximum applied load and the operating temperature(s). These decisions regarding materials and their dimensions may be made by iterating the following formula:

$$S_y(T) > \frac{3F}{wtn}\left(\frac{L}{t} + \sqrt{\left(\frac{L}{t}\right)^2 + \frac{1}{4}}\right)$$

As illustrated in FIG. 5, $S_y(T)$ is the material's yield strength at the maximum operating temperature, F is the total maximum thrust load expected to be exerted on the device 30, n is the number of load tabs 11, w is the width of a load tab 1, t is the thickness of a load tab 11, and L is the length of a load tab 11, as shown in FIG. 5. One familiar with the art may refine this equation to account for the effect of load distribution across the load tabs 11, a factor of safety, or other features desirable to the specific application.

If the device 30 will see usage in a long life application or if an oscillating load is expected, load tabs 11 may be designed such that the maximum stress within each load tab is below the fatigue limit $S_f(T)$ of the material for a prescribed number of cycles per the following formula.

$$S_f(T) > \frac{3F}{wtn}\left(\frac{L}{t} + \sqrt{\left(\frac{L}{t}\right)^2 + \frac{1}{4}}\right)$$

Figure 8:
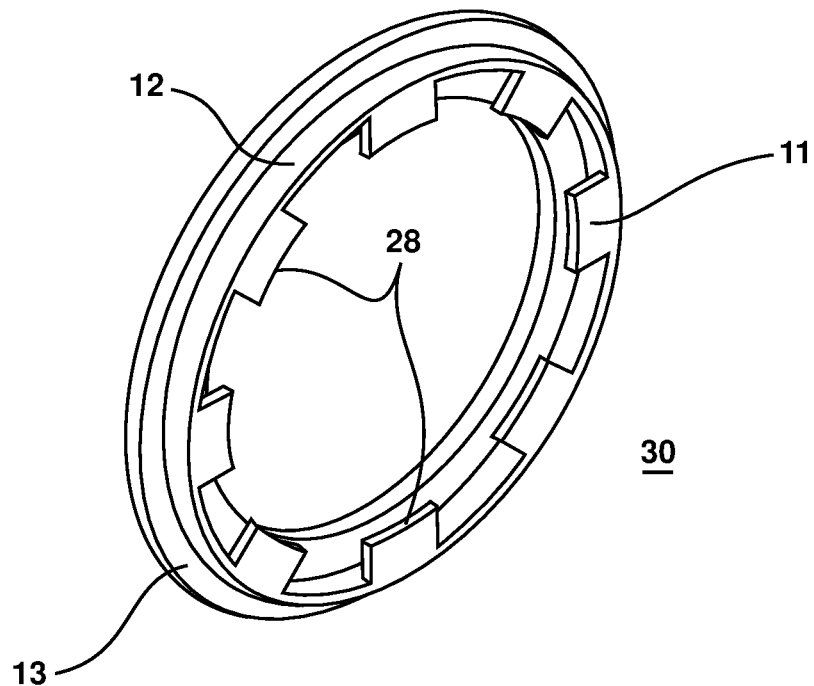
FIG. 8 depicts an isometric view of an embodiment of the invention with inwardly-oriented load tabs.

The load tabs 11 may be oriented perpendicular to the load direction, as depicted in FIG. 2. Depending on the application, the load tabs 11 may be oriented inwardly, toward the centerline 2, as depicted in FIG. 8, or outwardly, away from the centerline 2, as depicted in FIGS. 4-7. In one embodiment, a combination of inward and outward load tabs 11 may be included in a single device 30.

Figure 9:
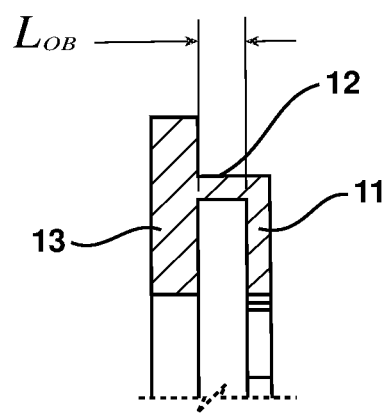
FIG. 9 depicts a cross-sectional view of the offset body arrangement of the embodiment of FIG. 8.

In one embodiment, the stability platform 13 is the anchor to the static structure 8 because the stability platform 13 may provide a means for the device 30 to resist the moment load created by the thrust force, thereby ensuring that the load tabs 11 remain analogous to a beam-in-bending. The geometry of the stability platform 13 may be defined by the available space and load path of the application being measured. In an embodiment with sufficient space in the axial direction, the stability platform 13 may separate in the axial direction from the load tabs 11, as depicted in FIG. 9. In another embodiment, if axial space is deemed to be insufficient, or if another arrangement is deemed more suitable, the stability platform 13 may be oriented in the radial direction from, and connected directly to, the load tabs, as depicted in FIGS. 16-19.

The offset body 12 may provide axial space for load tab 11 deflection when an embodiment with an axially-offset stability platform 13 orientation is chosen. The length of the offset body 12 may be chosen using the following equation for load tab 11 deflection such that the length of the offset body 12 is greater than said deflection.

$$L_{OB} > \delta = \frac{4FL^3}{wt^3 nE(T)}$$

Where $L_{OB}$ is the offset body length (see FIG. 9), $\delta$ is the free end axial deflection of a load tab 11, F is the total maximum thrust load expected to be exerted on the device 30, n is the number of load tabs 11, w is the width of a load tab 11, t is the thickness of a load tab 11, L is the length of a load tab 11, and E(T) is the material's Elastic Modulus at the maximum operating temperature. If an offset body 12 is not used, the same formula may be used to determine any axial separation needed between the load tabs 11 and any other component in the loading direction, including instrumentation used to measure deflection.

Figure 10:
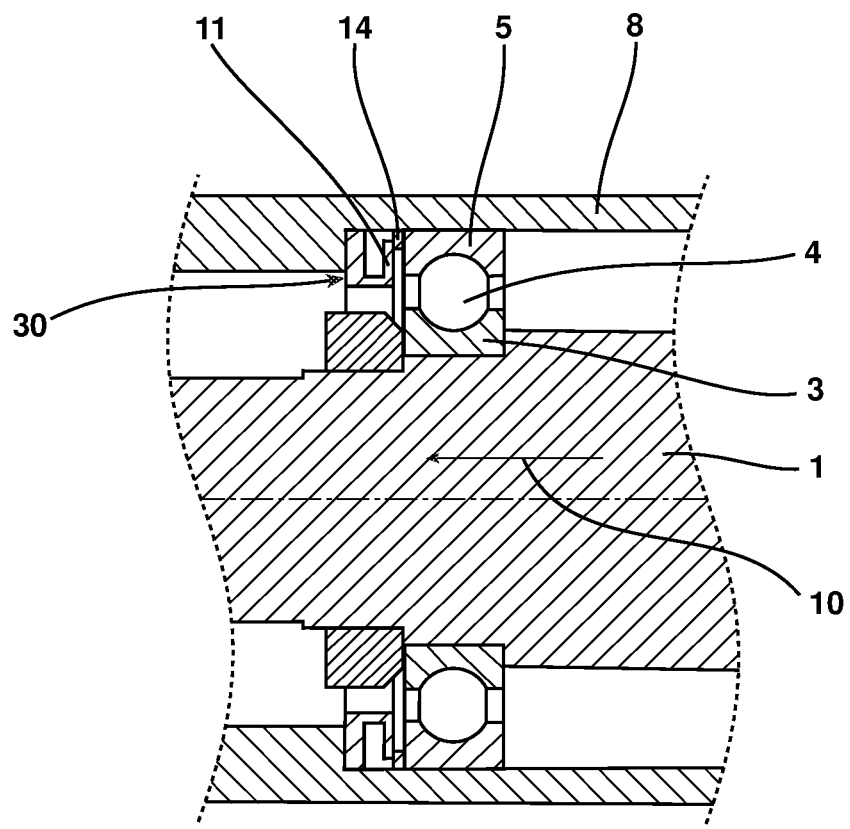
FIG. 10 depicts a cross-sectional view of an embodiment of the invention that includes a spacer between the bearing and the load tabs.
Figure 11:
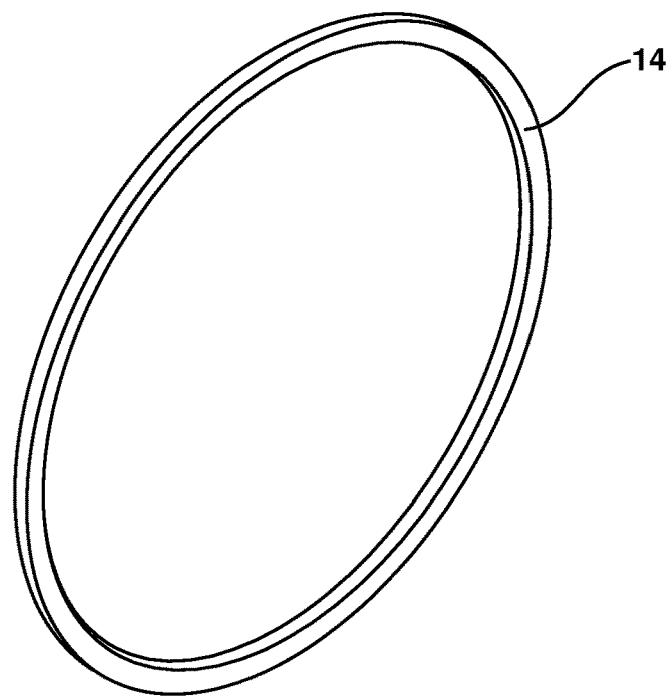
FIG. 11 depicts an isometric view of the spacer shown in FIG. 10.
Figure 12:
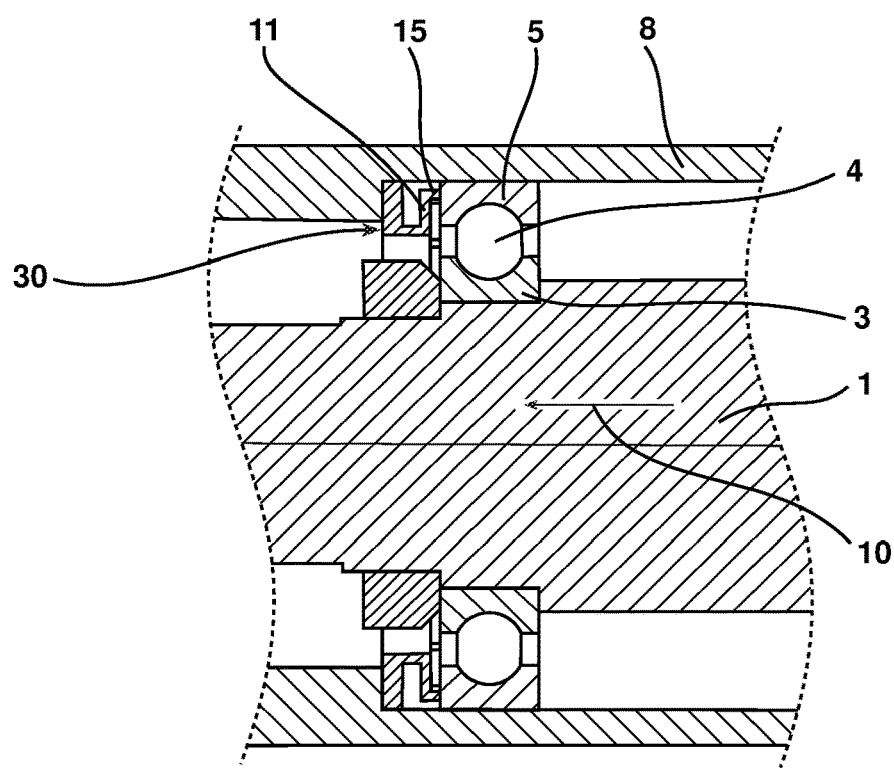
FIG. 12 depicts an installed cross-sectional view of an embodiment of the invention having a spacer integrated into the load tabs.
Figure 13:
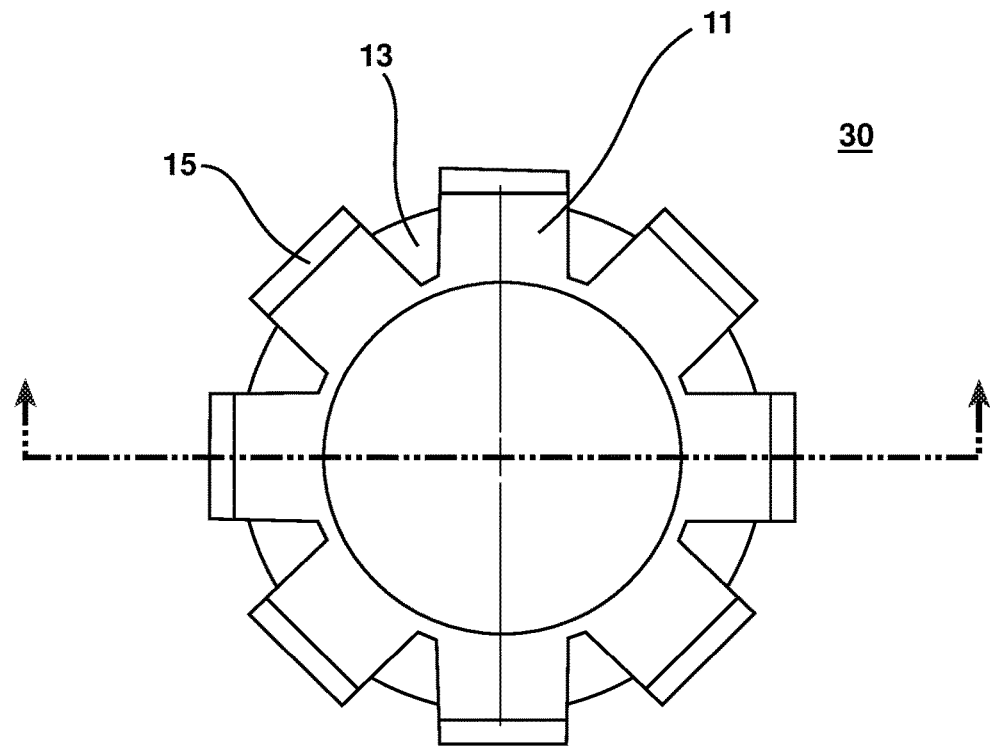
FIG. 13 depicts a plan view of the embodiment of FIG. 12 having a spacer integrated into the load tabs.
Figure 14:
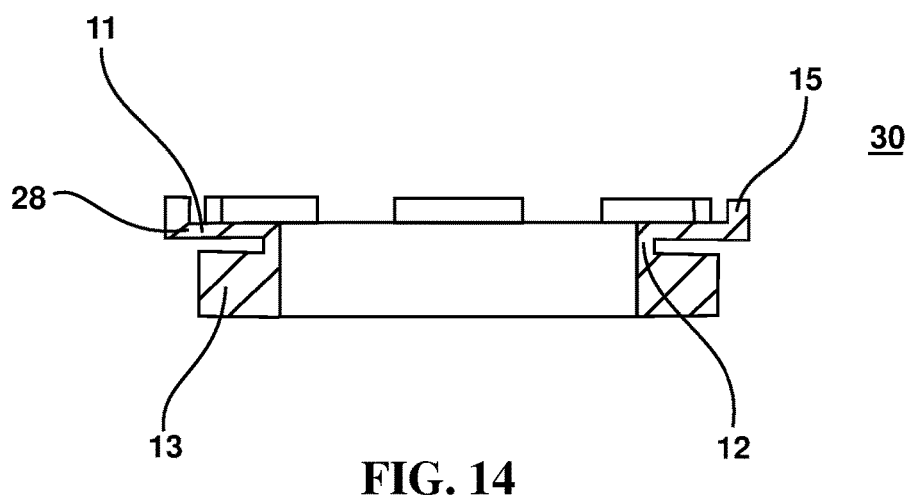
FIG. 14 depicts a sectional view of the embodiment of FIG. 13 having a spacer integrated into the load tabs.
Figure 15:
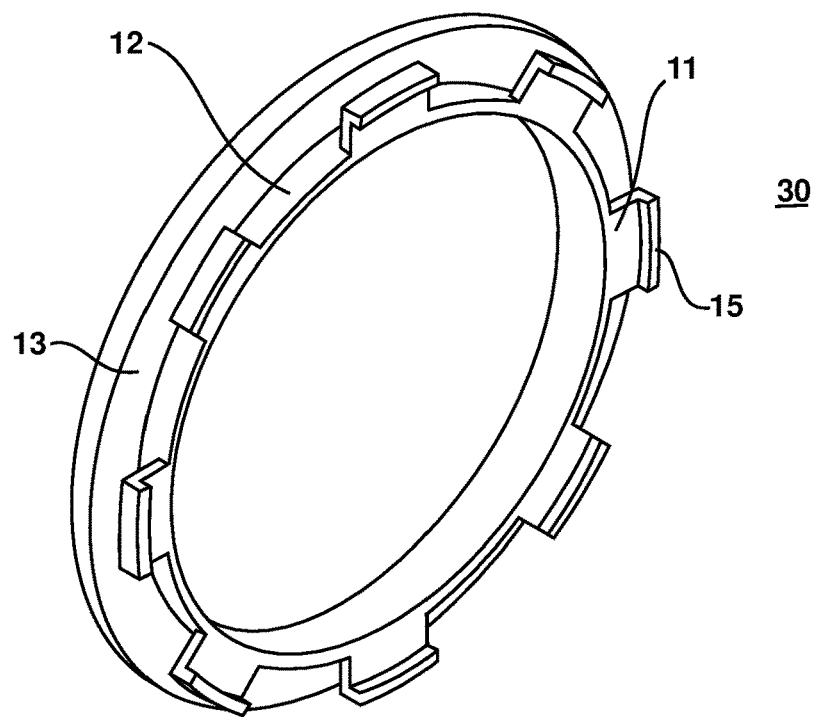
FIG. 15 depicts an isometric view of the embodiment of FIG. 12 having a spacer integrated into the load tabs.
Figure 16:
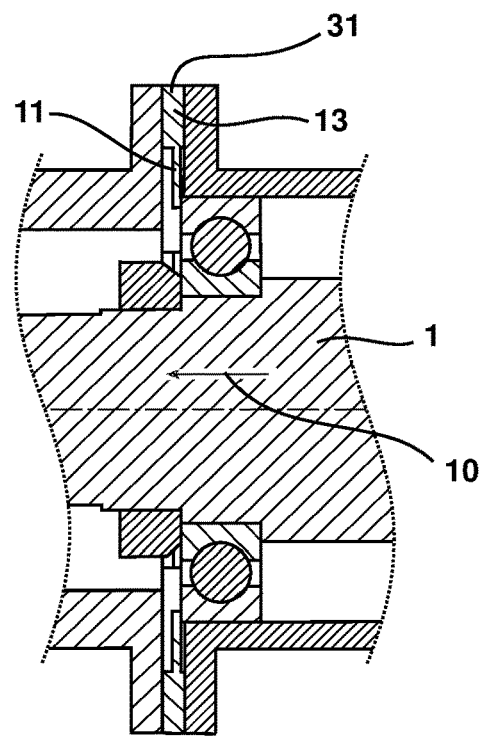
FIG. 16 depicts an installed cross-sectional view of a radially inward-oriented embodiment of the invention without an offset body.
Figure 17:
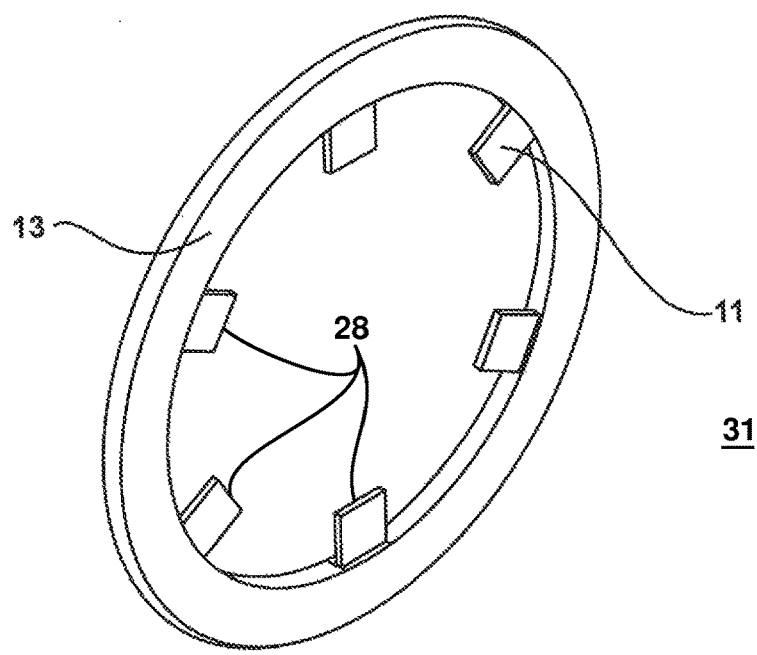
FIG. 17 depicts an isometric view of the embodiment of FIG. 16 having no offset body, and having radially inwardly-oriented tabs.
Figure 18:
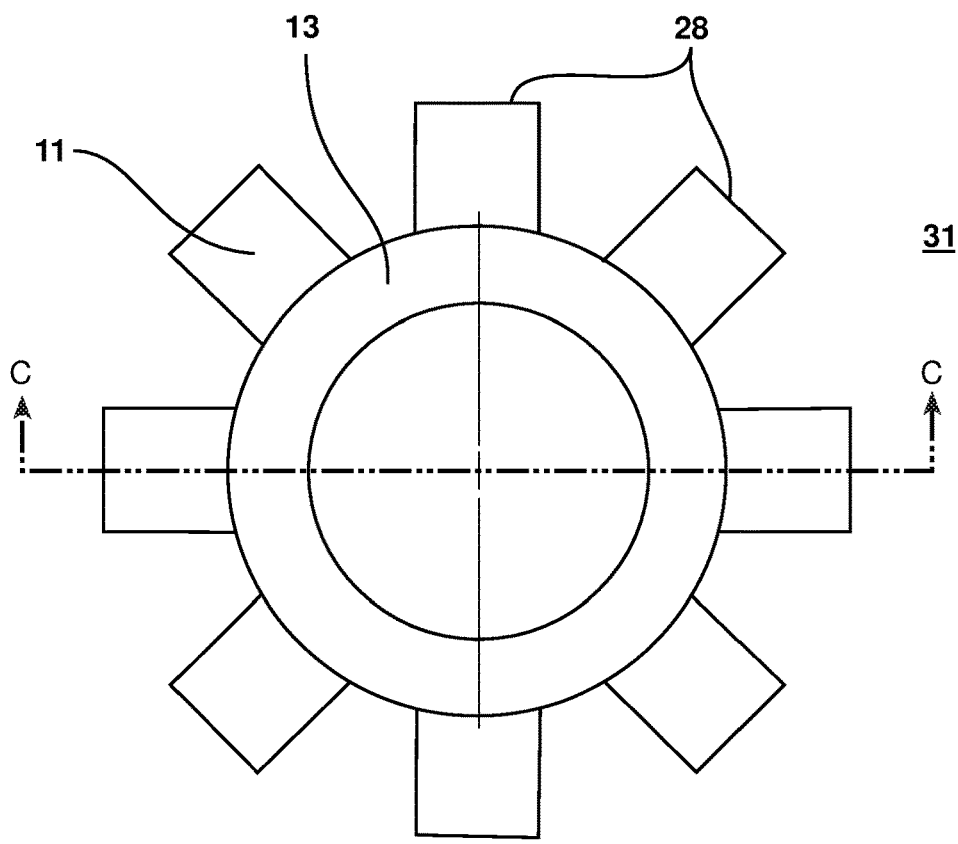
FIG. 18 depicts a plan view of an embodiment having no offset body, and having radially outwardly-oriented tabs.
Figure 19:
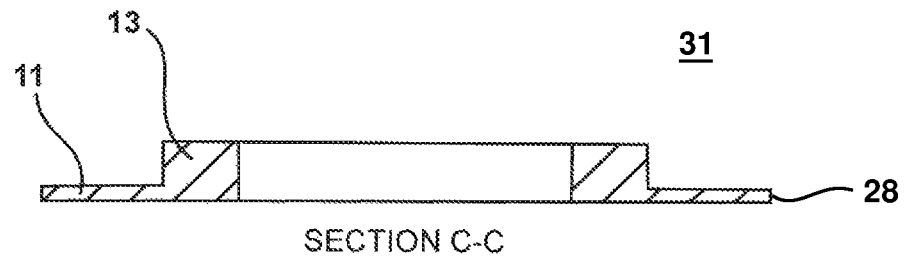
FIG. 19 depicts a sectional view of the embodiment of FIG. 18 with no offset body and having radially outwardly-oriented load tabs.

It is not necessary to have a sensor (e.g. strain gauge 17 or proximity sensor 19—see FIGS. 28-29) interface directly with the bearing 86. Instead, only that the sensor may be placed in the axial load path between the axially-free rotating structure (e.g. shaft 1) and the static structure 8. In some embodiments it may be desirable to include a spacer 14 (see FIGS. 10-11) between the load tabs 11 and the axially-free structure (such as the bearing outer ring 5). The bearing outer ring 5 may have a clearance fit with its housing (e.g. static structure 8) and can therefore slide axially. Features of the static structure 8 may be used to hold the bearing 86 in place (e.g. axial stop 9). It is this sliding (of the bearing outer ring 5) which allows loading or deflection of the load tabs 11. One example of an embodiment with a spacer 14 may include when the bearing 86 includes a cage or ball retainer (not shown). In this embodiment the spacer 14 is useful to prevent contact between the rotating cage and the load tabs 11. Another example is when it is found that the length requirement of the load tab 11 is too long relative to the axially-free structure, causing much more than the end of the load tab 11 to be in contact with the part face. In order to preserve the similarity to an end-loaded cantilevered beam, a spacer 14 may be used such that the end of the load tabs 11 are in contact with the bearing 86 or other load-imparting element. Such a spacer 14 may be a separate part or integrated into the load tabs 11. FIG. 10 depicts an example embodiment with a separate spacer 14, shown independently in FIG. 11. FIG. 12 depicts an example embodiment with a spacer 15 integral with the load tab 11. The integrated spacer 15 is also depicted in plan view in FIG. 13, in sectional view in FIG. 14, and in isometric view in FIG. 15.

As stated previously, the offset body 12 is not required and may be omitted when the stability platform is oriented in the radial direction. An example of this type of embodiment is shown in assembly cross-section in FIG. 16, in isometric view in FIG. 17, in plan view in FIG. 18, and in sectional view in FIG. 19. As a further possible variation, the load tabs 11 are radially inwardly-oriented in FIGS. 16-17, and radially outwardly-oriented in FIGS. 18-19.

Figure 20:
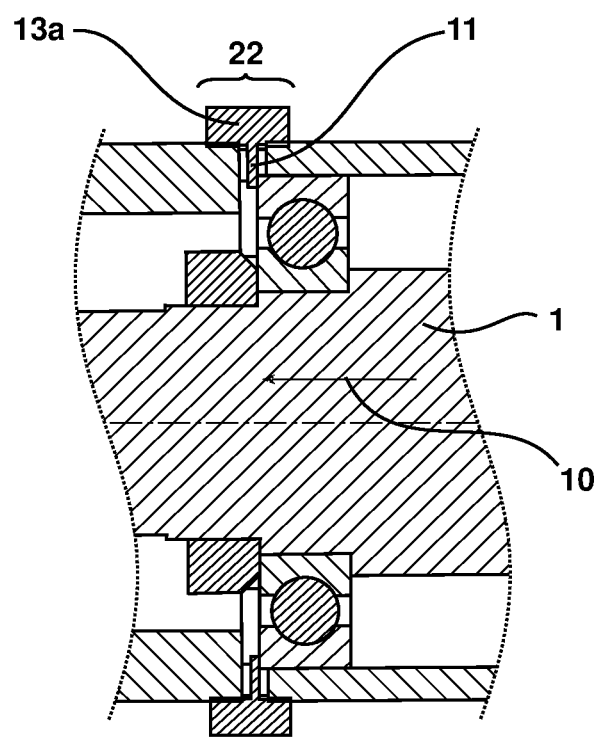
FIG. 20 depicts an installed cross-sectional view of an embodiment of the invention having multiple independent load tabs and stability platforms.
Figure 21:
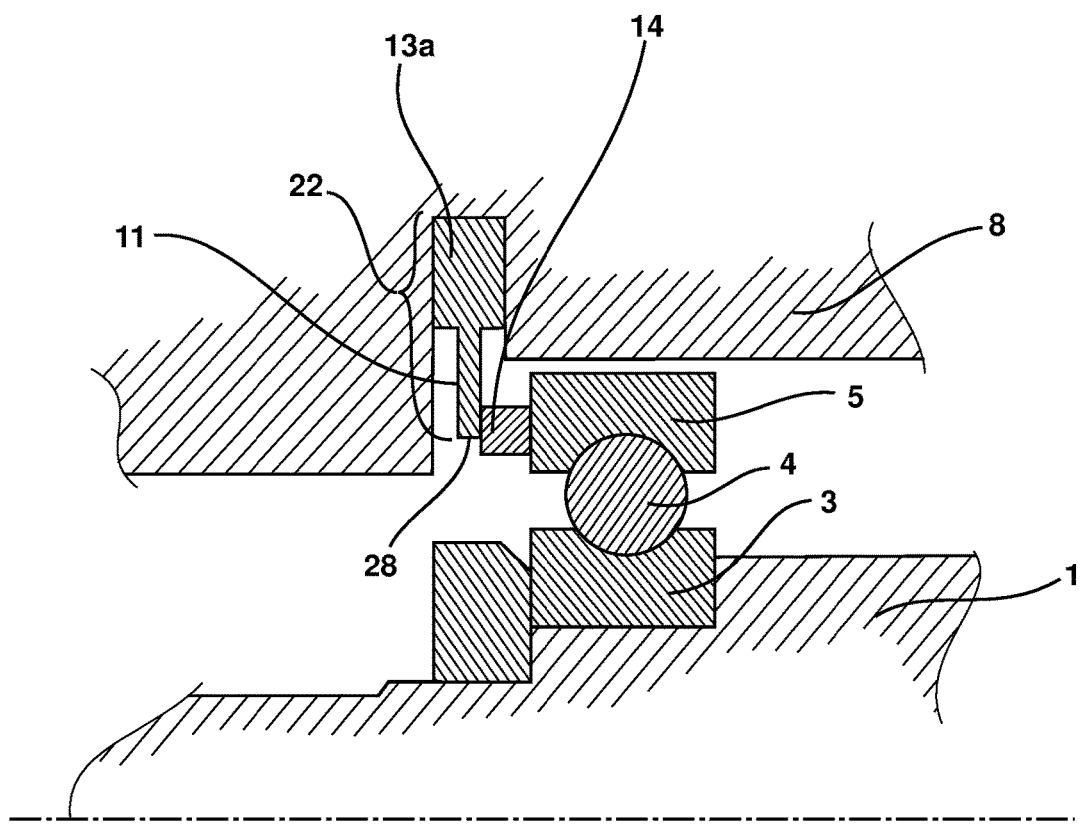
FIG. 21 depicts an alternative embodiment of the invention having multiple independent load tabs and stability platforms.
Figure 22:
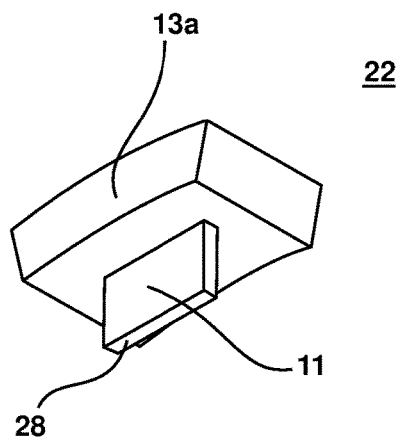
FIG. 22 depicts an isometric view of an independent load tab and stability platform.

In another embodiment, each load tab 11 may be included with an independent component 22 and not attached to one another. FIG. 20 depicts an assembly cross-section of such an embodiment of a load tab 11 on an independent stability platform 13a. FIG. 21 depicts a slightly different arrangement with the independent components 22 inside the overall structure, and FIG. 22 depicts an isometric view of the independent component 22 according to further embodiments. In these embodiments each independent component 22 may be made up of a load tab 11 and an independent stability platform 13a. These independent components 22 may be arranged around the centerline 2 in a symmetric form. In one embodiment the stability platform 13a of each independent component 22 may be anchored to the static structure 8 using a fastening method such as threaded fasteners or welds. The design equations provided above hold true for this embodiment as well. The load tab 11 of each independent component 22 may be arranged to be oriented radially inward or outward depending on the particular application requirements. The device 30 may be anchored in the same or similar manner.

Figure 23:
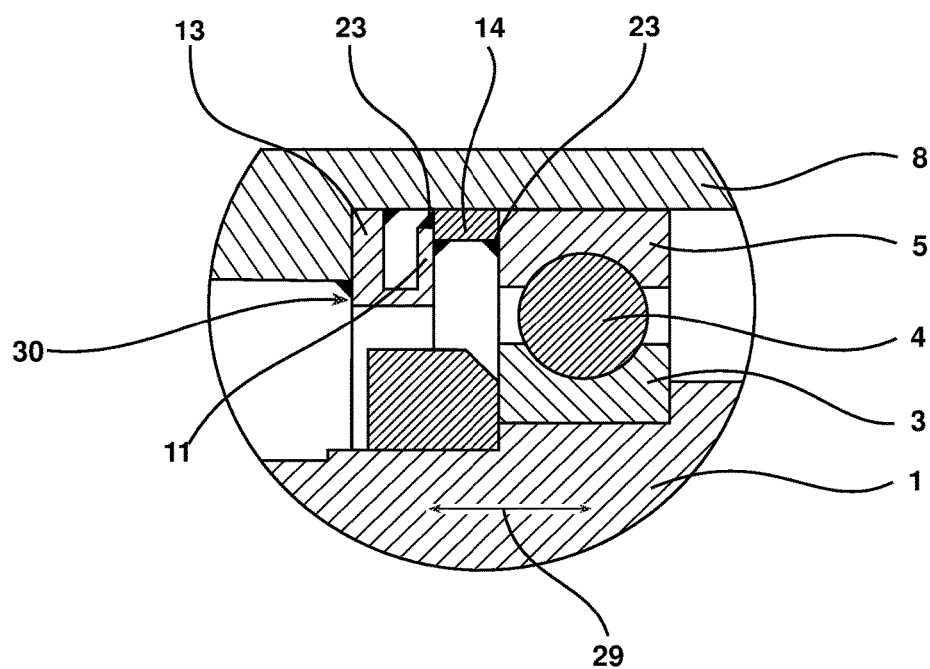
FIG. 23 depicts an installed cross-sectional view of an embodiment of the invention in which the thrust sensor is fastened to both the static structure and rotating structure allowing for bi-directional load measurement.
Figure 24:
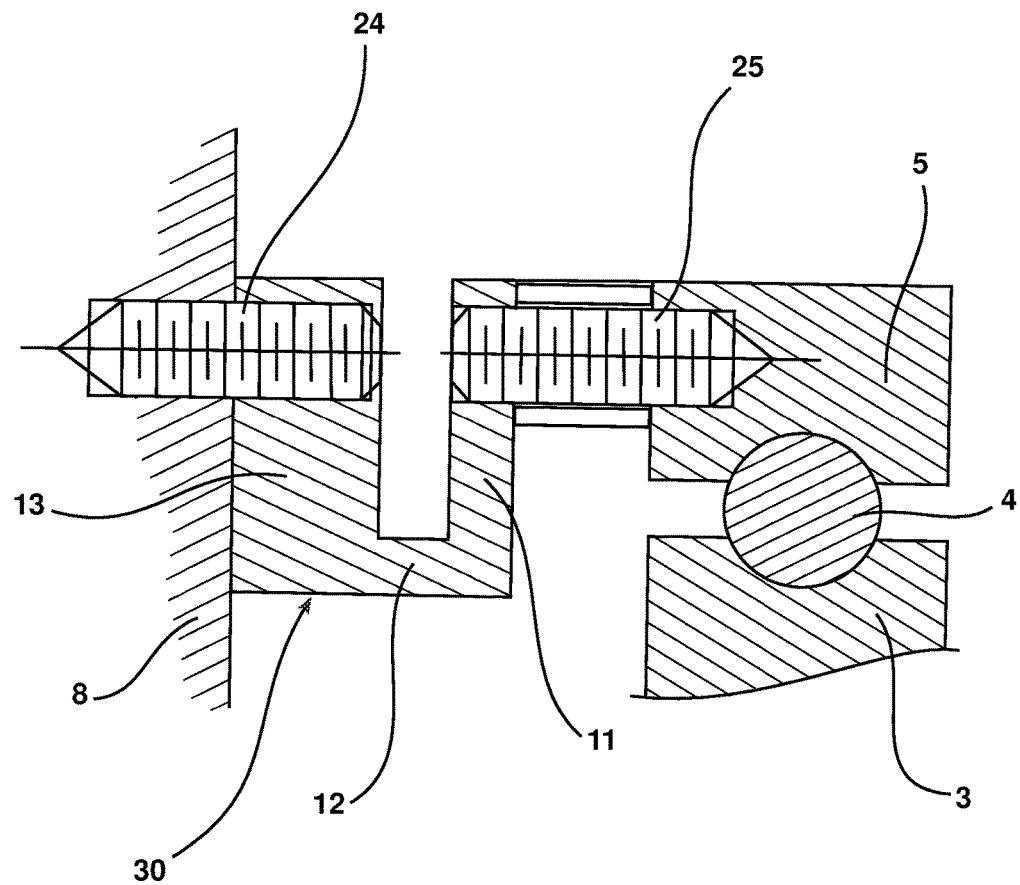
FIG. 24 depicts a sectional view of an embodiment of the invention wherein the device is attached to both the static and rotating structures allowing for bi-directional load measurement.

FIG. 23 displays an embodiment in which welds 23 (depicted as black triangles) have been used to fasten the device 30 to both the static structure 8 and the spacer 14, as well as the spacer 14 to the bearing outer ring 5. This embodiment allows for measurement of a bi-directional thrust load 29. In order to enable bi-directional measurement, the device may be anchored to the load path on each axial side of the device. The fastening method is based on the needs of the particular application and the space available. Five welds 23 are depicted in FIG. 23, but the number of welds is a design choice as long as the device 30 is anchored to the static structure 8 in order to provide axial force measurements in both axial directions 29. FIG. 24 depicts an embodiment in which the device is secured or anchored with an outer fastener 24 and an inner fastener 25, e.g. bolts, screws, pins, or other arrangement, to provide both tension and compression load data, which corresponds to a bi-directional load measurement.

Figure 25:
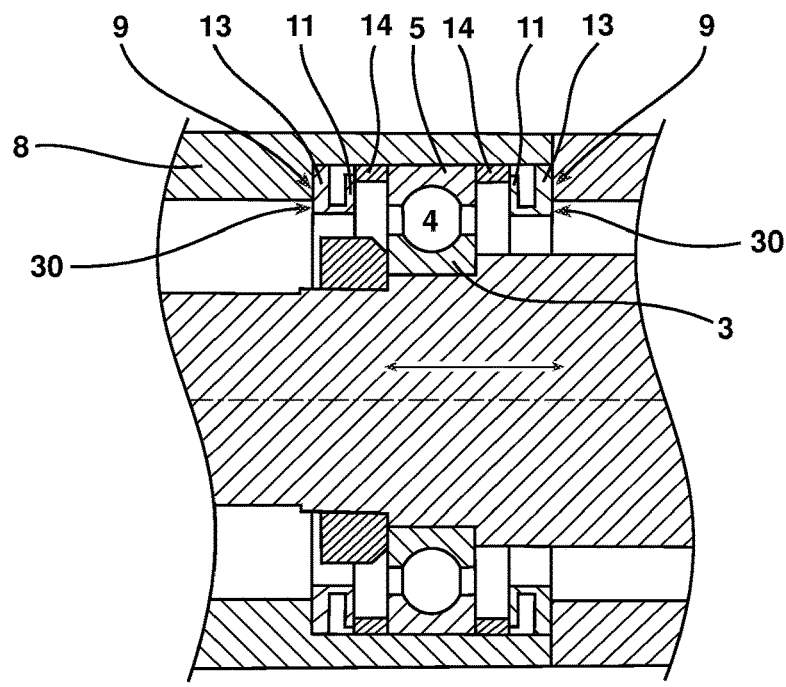
FIG. 25 depicts an installed cross-sectional view of an embodiment of the invention in which a thrust sensor is placed into both the forward and aft sides of the bearing allowing for bi-directional load measurement.

FIG. 25 depicts an alternate embodiment for measuring bi-directional thrust loads in which two devices are utilized, one on each side of the thrust bearing 3-5. Note that an axial stop 9 is provided on the static structure 8 in the aft direction. The devices are depicted as mirror images, but the particular arrangement may depend on space availability and operational considerations.

Figure 26:
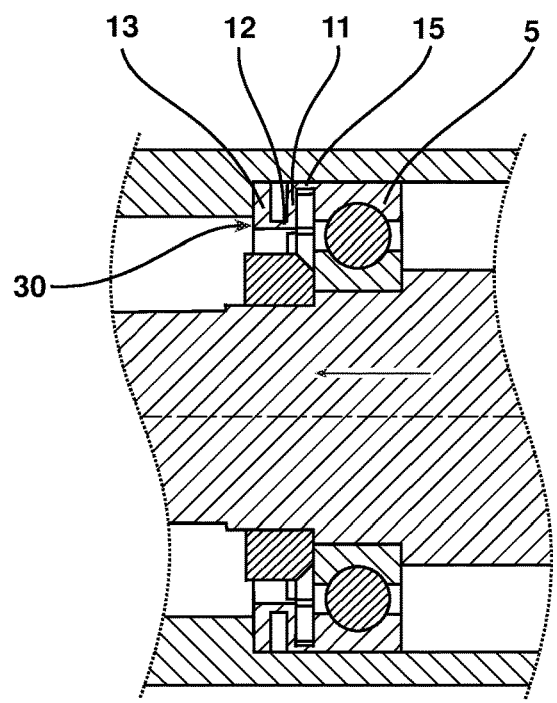
FIG. 26 depicts an installed cross-sectional view of an embodiment of the invention wherein the thrust sensor is integral with the bearing outer ring.
Figure 27:
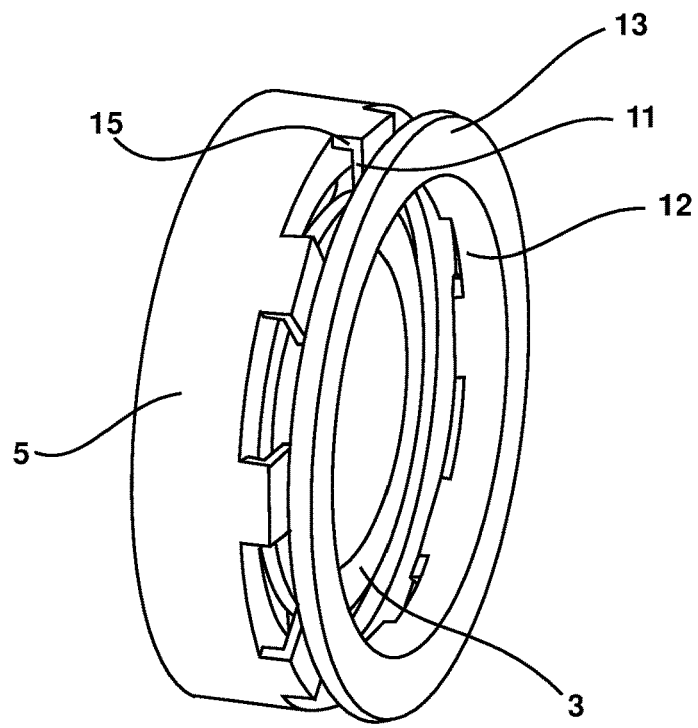
FIG. 27 depicts an isometric view of the embodiment of FIG. 26.

A further alternative embodiment is one in which the device 30 and spacer 15 is integrated into the bearing outer ring 5 as a single piece. FIGS. 26-27 depict an embodiment of this type. The constituent components, i.e. the bearing outer ring 5, integral spacer 15, load tab 11, offset body 12, and stability platform 13 are each identified in FIGS. 26-27 for clarity.

Figure 28:
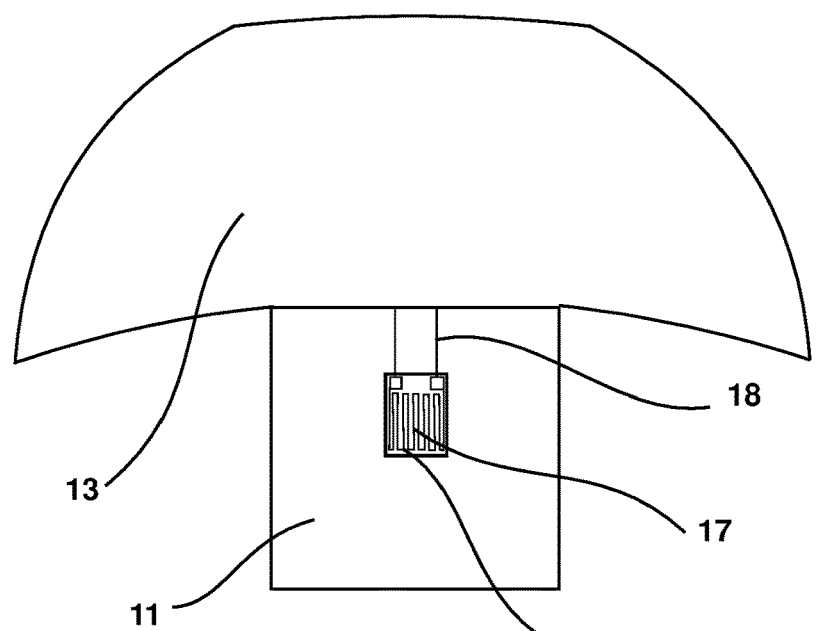
FIG. 28 depicts an example of a strain gauge mounting location on an exemplary load tab, according to an embodiment of the invention.
Figure 29:
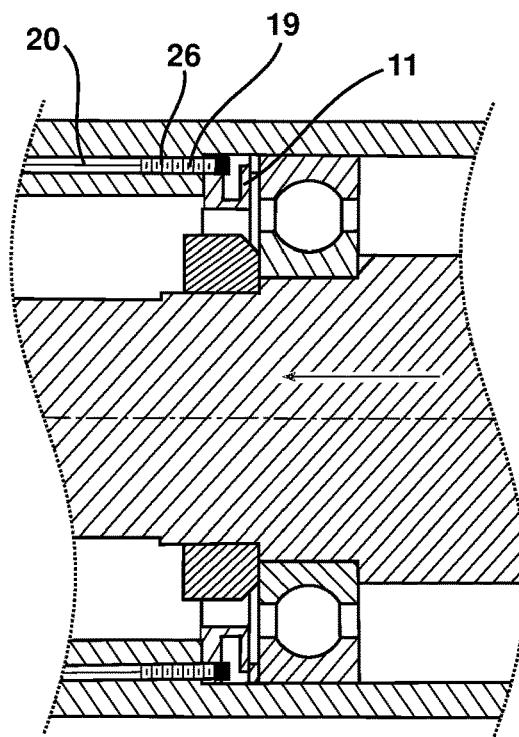
FIG. 29 depicts an installed cross-sectional view of an embodiment of the invention utilizing proximity probes for load tab deflection measurements.

Measurements may be provided by strain gauge 17 mounted to either side of the load tabs 11 as depicted in FIG. 28. Various other measurement devices may be used with or instead of the strain gauge 17. The lead wires 18 may be wired into a Wheatstone bridge type configuration. In another embodiment a proximity measurement of the end of the load tabs 11 may be measured through instrumentation such as proximity probes or clearanceometers. FIG. 28 depicts a typical strain gauge 17 which may be mounted on one side of a load tab 11 with the instrumentation lead wires 18 attached to the strain gauge 17. FIG. 29 depicts an embodiment using eddy current proximity probes 19 to measure the deflection of the load tab 11. The probe's lead wires 20 may also be seen. An individual skilled in the art will readily be able to convert strain or displacement measurements into the applied thrust force.

At least one load tab 11 should be instrumented. In one embodiment, the device may be utilized by instrumenting a single load tab 11, thereby minimizing the required instrumentation channels. Alternatively, all load tabs 11 may be instrumented, thereby allowing for redundancy in the case of instrumentation failure or providing the capability to detect a non-uniform or misaligned load. The user may choose to instrument any number of load tabs 11 in order to balance these factors for the specific application.

Figure 30:
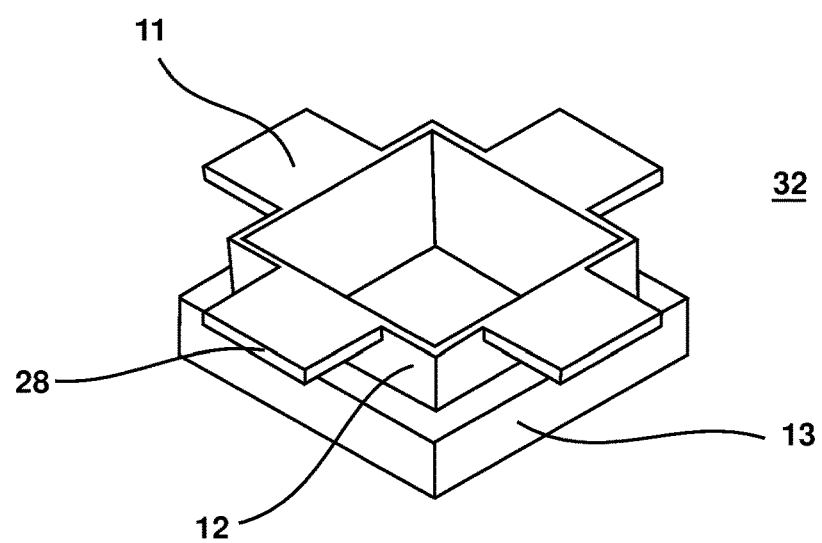
FIG. 30 depicts an embodiment of the invention utilizing square rather than circular geometry.
Figure 31:
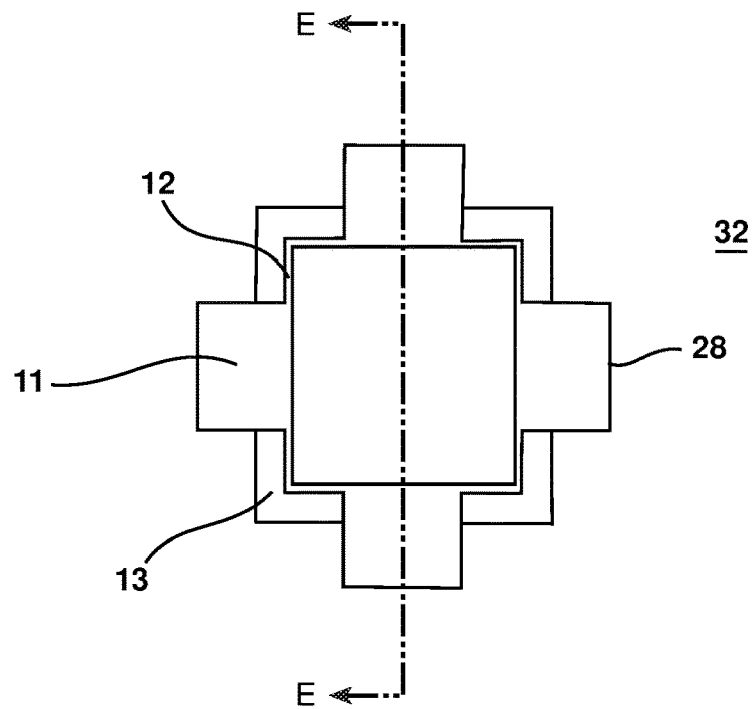
FIG. 31 depicts a plan view of the embodiment of the invention of FIG. 30.
Figure 32:
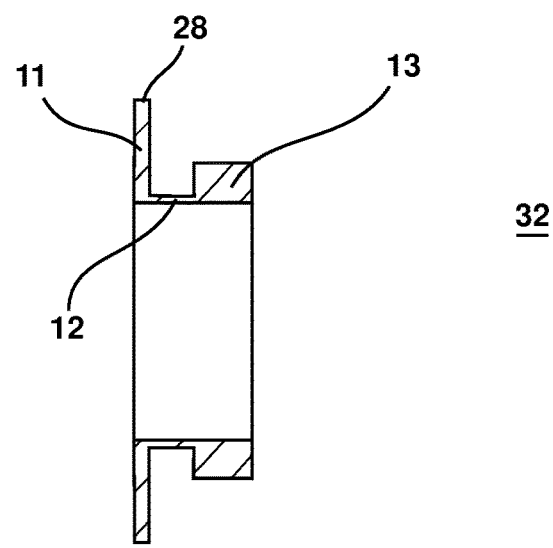
FIG. 32 depicts a sectional view of the embodiment of FIG. 31.
Figure 33:
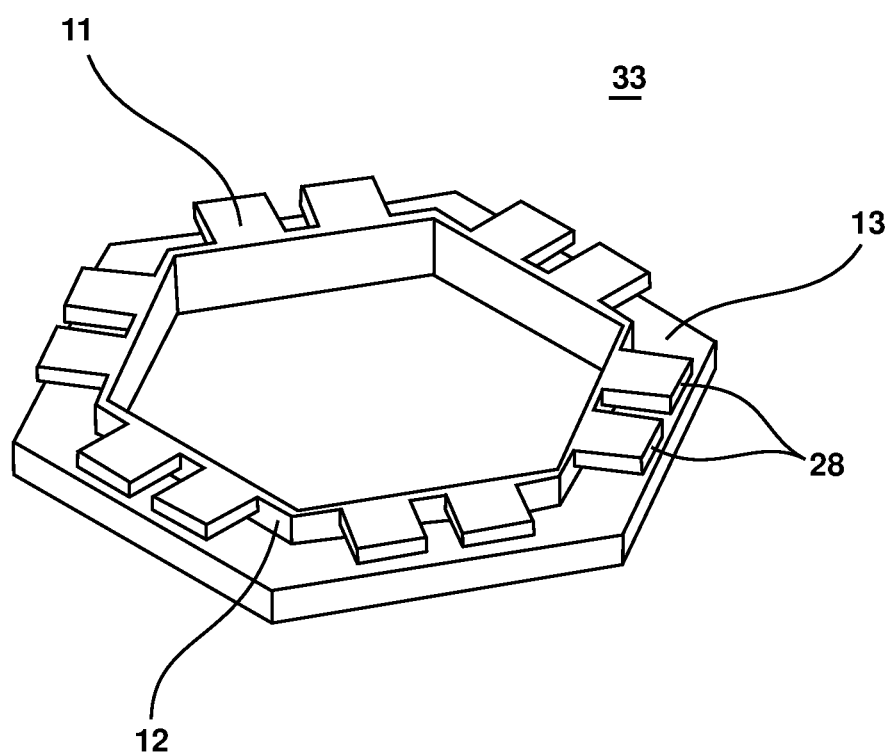
FIG. 33 depicts an embodiment utilizing hexagonal rather than circular geometry.
Figure 34:
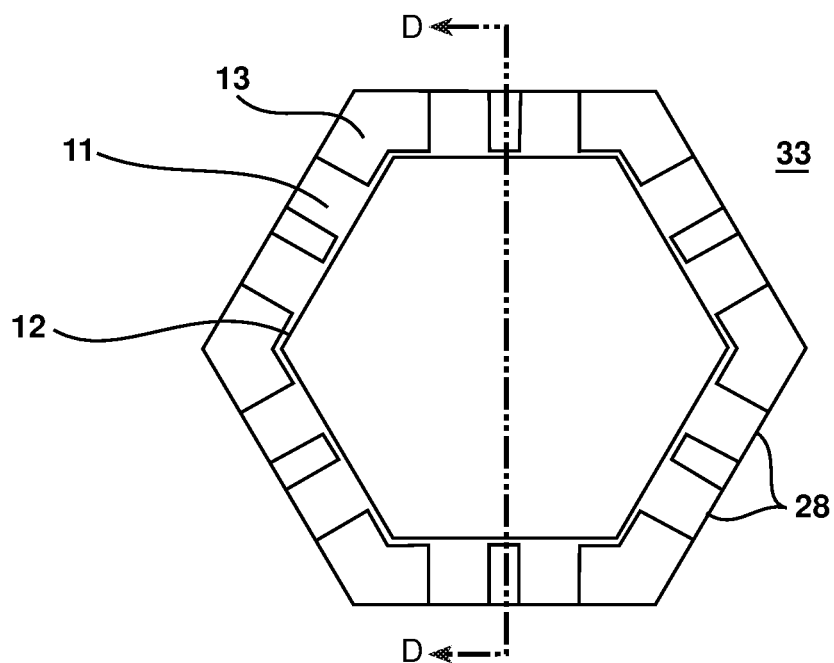
FIG. 34 depicts a plan view of the embodiment of the invention of FIG. 33.
Figure 35:
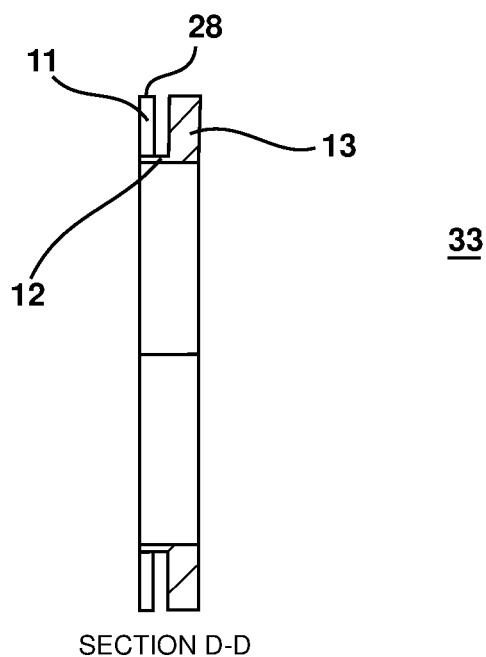
FIG. 35 depicts a sectional view of the embodiment of the invention of FIG. 34.

Non-circular embodiments of the device 30 are also acceptable. FIGS. 30-32 depict a square geometry embodiment 32, and FIGS. 33-35 depict a hexagon geometry embodiment 33. The geometry of the device may be altered to best fit the application, and numerous polygon configurations may be implemented. However, a geometry which is symmetric about the centerline may be easiest to determine axial thrust loads.

Figure 36:
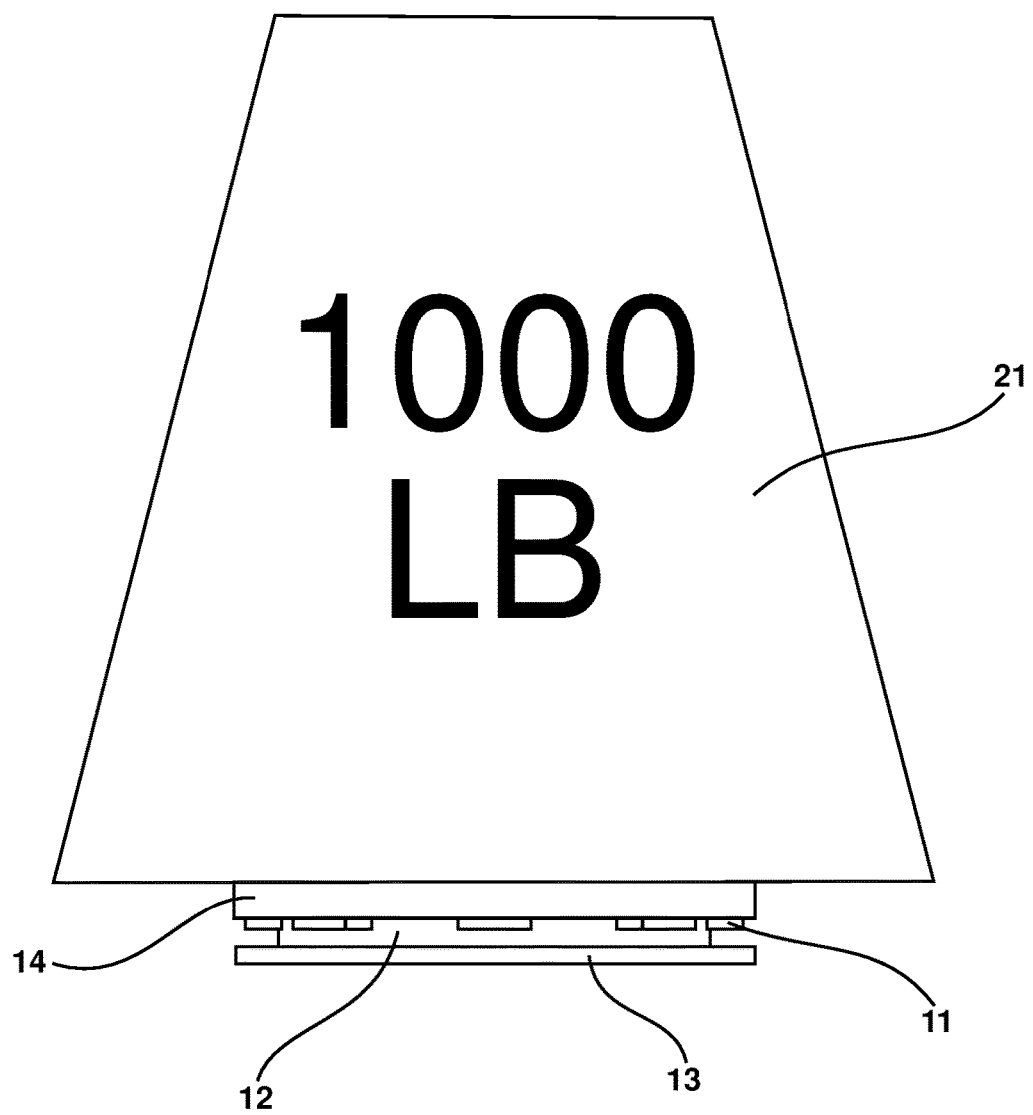
FIG. 36 depicts an embodiment of the invention in an alternative floor scale application.
Figure 37:
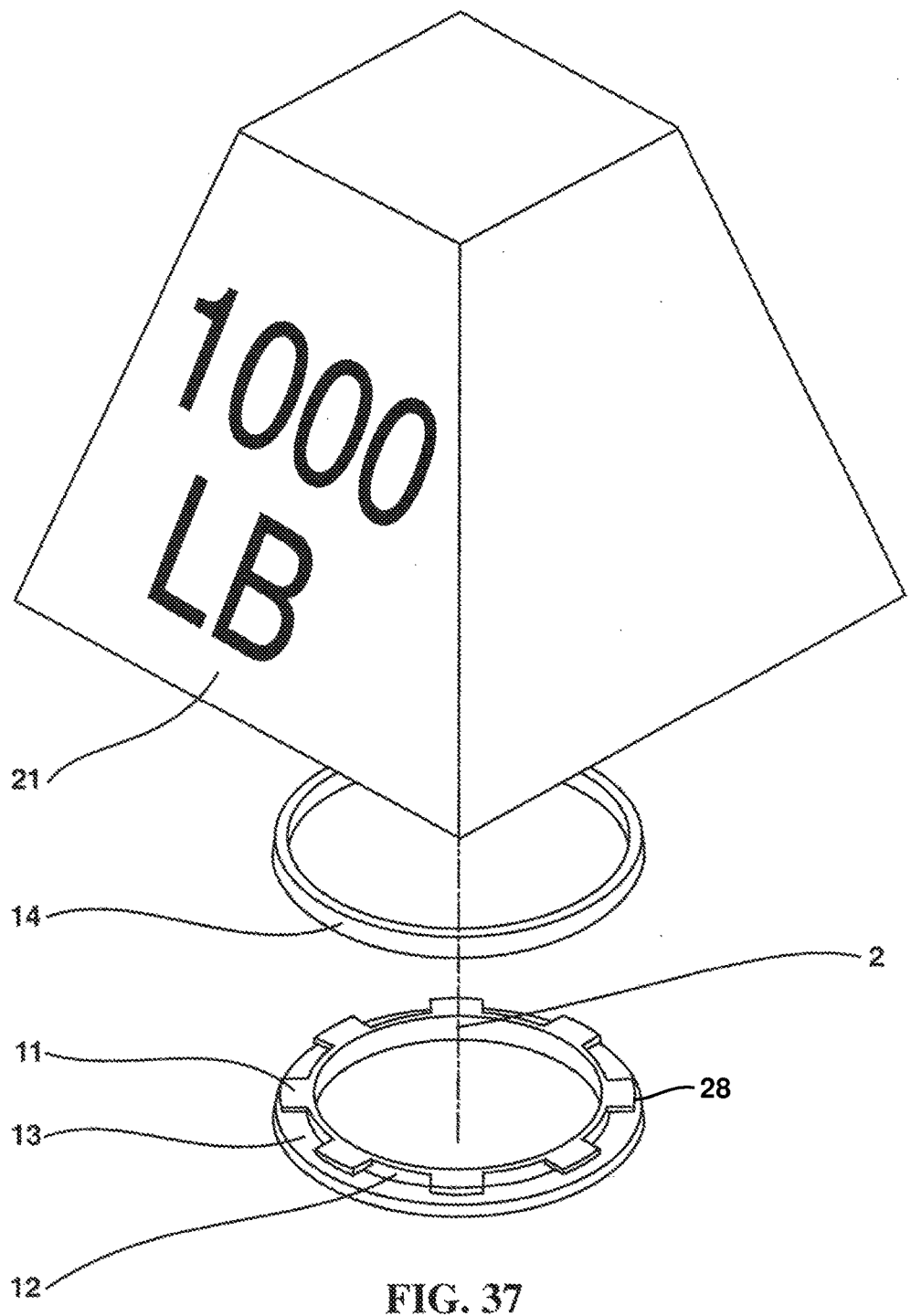
FIG. 37 depicts an exploded view of the embodiment of the invention of FIG. 36.

FIGS. 36-37 depict an alternate usage for the device as a floor scale. The described device and methodology provide a new and previously unavailable measurement capability for the axial force on a main shaft thrust bearing in turbo machinery. This method is also applicable to load measurements of rotating machinery in general and other applications. The device and methodology is capable of measuring single axis of application loads and is not necessarily limited to bearing or rotating machinery measurements or configurations. This device may also be used in other applications such as, but not limited to: oil drilling, rocket engines, experimental test rigs or other systems where the thrust load is needed information.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A device for measuring axial load on a thrust bearing in an engine having a shaft inside a fixed structure, comprising:
    a stability platform in contact with the fixed structure and prevented from motion in an axial direction;
    at least one load tab adjacent to and supported by the stability platform, the at least one load tab oriented perpendicular to the axial direction, each load tab having a free end opposite the end supported by the stability platform, the free end adjacent the shaft;
    an offset body attached between the at least one load tab and the stability platform; and
    a deflection sensor attached to the at least one load tab and responsive to the axial load, wherein the axial load is applied to the free end of the at least one load tab, wherein the offset body is arranged perpendicular to the stability platform, and the at least one load tab is parallel with the stability platform.

2. The device for measuring axial loads in a thrust bearing of claim 1, wherein the at least one load tab and the stability platform are oriented radially inward toward the device axis.

3. The device for measuring axial loads in a thrust bearing of claim 1, further comprising a plurality of load tabs arranged symmetrically on the stability platform.

4. The device for measuring axial loads in a thrust bearing of claim 1, wherein the free end of the at least one load tab is oriented radially inward toward the device axis.

5. The device for measuring axial loads in a thrust bearing of claim 1, wherein the free end of said load tabs are oriented radially outward away from the device axis.

6. The device for measuring axial loads in a thrust bearing of claim 1, further comprising a spacer between the free end of the at least one load tab and the shaft.

7. The device for measuring axial loads in a thrust bearing of claim 6, wherein the spacer is integral to the free end of the at least one load tab.

8. The device for measuring axial loads in a thrust bearing of claim 1, wherein the deflection sensor is at least one of a strain gauge and a proximity sensor.

9. The device for measuring axial loads in a thrust bearing of claim 8, wherein the proximity sensor monitors the displacement of the free end of the at least one load tab.

10. The device for measuring axial loads in a thrust bearing of claim 8, wherein the strain gauge measures material strain in the at least one load tab.

11. The device for measuring axial loads in a thrust bearing of claim 1, wherein the free end of the at least one load tab is fixed to a support for the shaft which is isolated from the end of the load tab which is supported by the stability platform.

12. The device for measuring axial loads in a thrust bearing of claim 1, further comprising:
    a second stability platform in contact with the fixed structure and prevented from motion in a second axial direction opposite the axial direction;
    at least one second load tab adjacent to and supported by the second stability platform, the at least one second load tab oriented perpendicular to the axial direction, each second load tab having a free end opposite the end supported by the second stability platform, the free end adjacent the shaft; and
    a second deflection sensor attached to the at least one second load tab providing deflection information correlating to thrust load, wherein the axial load is applied to the free end of the at least one second load tab.

13. The device for measuring axial loads in a thrust bearing of claim 1, wherein the at least one load tab and the stability platform are oriented radially outward from the device axis.

\* \* \* \* \*